(12) United States Patent
Park

(10) Patent No.: US 7,924,363 B2
(45) Date of Patent: *Apr. 12, 2011

(54) LIQUID CRYSTAL DISPLAY DEVICE

(75) Inventor: Sang Hyun Park, Ulsan-Kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/143,342

(22) Filed: Jun. 20, 2008

(65) Prior Publication Data

US 2008/0246901 A1    Oct. 9, 2008

(30) Foreign Application Priority Data

May 19, 2003    (KR) .................. 10-2003-0031636

(51) Int. Cl.
G02F 1/1333 (2006.01)
G02F 1/1345 (2006.01)

(52) U.S. Cl. .......................... 349/58; 349/150

(58) Field of Classification Search .............. 349/58–60, 349/149–152
See application file for complete search history.

(56) References Cited

U.S. PATENT DOCUMENTS 7,403,241 B2 *   7/2008   Park ............................. 349/58

* cited by examiner

Primary Examiner — Dung T. Nguyen
(74) Attorney, Agent, or Firm — Brinks Hofer Gilson & Lione

(57) ABSTRACT

A liquid crystal display device includes a support main, a lamp housing, a printed circuit board (PCB), a top case and a cover bottom. The support main is a bottom portion of a liquid crystal display device module (LCM). The lamp housing is disposed at sides of the support main in a long side direction of the support main. The PCB is disposed on a back surface of the support main. The top case is a top portion of the LCM and has projection pieces from a side thereof. The cover bottom is disposed on an upper surface of the support main. The cover bottom has first extension pieces for electrical connection to the top case and second extension pieces projected to a lower surface of the support main for electrical connection to the printed circuit board, thereby making secure fastening and grounding.

19 Claims, 7 Drawing Sheets

LIQUID CRYSTAL DISPLAY DEVICE

This application claims benefit of the U.S. patent application Ser. No. 10/843,524, filed May 11, 2004, has been allowed and is hereby incorporated in its entirety by reference. This application also claims the benefit of the Korean Application No. P2003-0031636 filed on May 19, 2003, which is hereby incorporated in its entirety by reference.

BACKGROUND OF THE INVENTION

1. Field of the Invention

The present invention relates to a liquid crystal display device having a secure fastening and grounding structure, which can improve productivity.

2. Background of the Related Art

Liquid crystal display devices (hereafter called "LCD") are lightweight, thin, and have low power consumption. Recently LCDs require accelerating improvement in terms of picture quality owing to improvement in the liquid crystal material forming the LCDs, and the development of micron pixel forming technologies. These advances have gradually widened the range of applications ranges of the LCDs.

In general, a liquid crystal module (hereafter called as "LCM") is provided with a liquid crystal display panel. The liquid crystal display panel contains liquid crystal injected between upper and lower glass substrates, a polarizing plates at upper and lower surfaces of the liquid crystal panel for polarizing light transmitted therethrough, and a backlight unit. The backlight unit has a light source and a light plate for supplying light to the liquid crystal display panel. The LCM receives a picture signal from outside the LCM and displays the picture signal thereon.
driving the LCM, and a system case.

FIG. 1 illustrates a perspective disassembled view of a related art LCM, and FIGS. 2A and 2B illustrate a ground structure of a related art LCD. FIG. 2A illustrates a front enlarged view of an LCM, and FIG. 2B illustrates a back enlarged view of the LCM.

Referring to FIG. 1, a related art LCM 10 has a backlight portion 12, and a liquid crystal panel 11, both supported on a support main 13 and a top case 20.

There is a cover bottom 14 on an inside bottom of the support main 13, and there is a backlight portion 12 on the cover bottom 14, having a reflective plate 12a, a light plate 12b, a spreading, or protective sheet 12c, a first prism sheet 12d, a second prism sheet 12e, a spreading or protection sheet 12f, and a lamp 25. The liquid crystal panel 11 is placed on the backlight portion 12.

The lamp 25, at one side of the support main 13, emits light, and there is a lamp housing (not shown) around the lamp 25 for protection of the lamp 25, and reflecting the light.

In the meantime, there is a top case 20 of metal over the liquid crystal panel 11, fastened to underlying support main 13, to hold the liquid crystal panel 11, and the backlight unit 12.

The cover bottom 14 of metal at a side of the support main 13 serves as a heat discharging plate for dissipating and discharging heat from the light source to an outside of the LCD, as well as reinforcement of a bottom supporting structure for prevention of distortion of the LCM 10 by an external force applied to the LCM 10. The cover bottom 14 also supports the light plate 12b and various sheets 12.

In the meantime, there is a printed circuit board (hereafter called as "PCB") and the like under the support main 13, a back side of the LCM 10. The PCB 30 has a Drive Integrated Circuit (hereafter called as "D-IC") mounted thereon for driving switching devices (i.e., WT array) of the LCM 10. The LCM 10 and the PCB 30 are electrically connected with a Tape Carrier Package (hereafter called as "TCP") 31 for transmitting control signals and video signals from the D-IC to the LCM 10. The PCB 30 is connected to the liquid crystal panel 11 with the TCP 31, and in general in close contact with a back side surface of the support main 13 when the PCB 30 is mounted inside of the liquid crystal display device. For putting the PCB 30 on the back side surface of the support main 13, the TCP 31 is folded to a back side from a state extended in a lateral direction.

If is required, the liquid crystal device is provided with a ground structure for preventing defective system operation or distortion of a picture caused by Electro-Magnetic Interference (hereafter called as "EMI").

In general, a driving circuit of the LCD is influenced by electromagnetic waves. Particularly, since the PCB 30 has devices, such as a power supplying circuit, and switching devices, to induce an inductive voltage caused by external static induction and electromagnetic induction, it is required that conductive components of the LCD are grounded without fail for preventing this.

For this, it is required that the PCB 30 is grounded to the top case 20, and the top case 20 is electrically connected to a ground structure of a system external case, for securing stable operation of the PCB. Moreover, it is also required that the lamp housing that surrounds the lamp 25 is grounded.

FIG. 2A illustrates a front surface of the LCM 10, having a projection from each corner. The projection 20a is used as a screw fastening portion for fastening the LCM 10 to a system case by a front mounting method.

That is, the projection 20a has a plurality of screw fastening holes 21a, and 21b. The fastening holes 21a are for fastening the LCM 10 itself and the fastening holes 21b are for fastening the LCM 10 to the system case. One of each of the fastening holes 21a for fastening the LCM 10 itself is in each of the projections in upper and lower portions of a right side of the LCM 10.

FIG. 2B illustrates a back side of the LCM 10. Also, in the back side of the LCM 10, the LCM 10 itself is fastened with screws. According to this, the LCM 10 has screw fastening holes 22a, 22b, 22c, 22d, and 22e, in corners and a central portion. Referring to FIG. 2B, the LCM 10 has five screw fastening holes 22a, 22b, 22c, 22d, and 22e in total in the back side surface of the LCM 10.

The screw fastening holes in the front and back surfaces fasten the LCM 10 itself, and the screws fastened to the screw fastening holes ground the PCB 30.

There are structures 23 for grounding the PCB 30 to the cover bottom 14, and the screws for fastening the LCM 10 itself ground the cover bottom 14 to the lamp housing and the top case 20. Accordingly, by screwing the screws into the fastening holes in the LCM 10, the LCM 10 itself is fastened, and the grounding structure is completed.

However, the related art LCD has the following problems.

First, the cost for many screws and the time required for fastening these screws due to many screw fastening holes in the related art reduces productivity.

Second, the foreign material formed during making many screw holes reduces the secure productivity of the LCM itself.

Third, there are intermittent discontinuities in the grounding contact surfaces between the top case and the cover bottom in the projections at a side of the LCM of the related art caused by assembly tolerance. This causes the contact surfaces to fail to eliminate the influence of noise coming from the electromagnetic wave.

SUMMARY OF THE INVENTION

Accordingly, embodiments of the present invention provide a liquid crystal display device which enables secure grounding of LCM components.

Additional features and advantages of the invention will be set forth in the description which follows, and in part will be apparent to those having ordinary skill in the art upon examination of the following or may be learned from practice of the invention. These and other advantages of the invention will be realized and attained by the structure particularly pointed out in the written description and claims hereof as well as the appended drawings.

To achieve these and other advantages and in accordance with the present invention, as embodied and broadly described herein, the liquid crystal display device (LCD) includes a support main which is a bottom portion of a liquid crystal display device module, lamp housings at sides of the support main in a long side direction of the support main, a printed circuit board on a back surface of the support main, a top case which is a top portion of the liquid crystal display device module, having projection pieces from a side thereof, and a cover bottom on an upper surface of the support main, having first extension pieces for electrical connection to the top case, and second extension pieces projected to a lower surface of the support main for electrical connection to the printed circuit board.

The first extension piece is formed at a position opposite to the projection piece, and includes a bending portion in a portion in contact with the projection piece for elastic deformation by a pressure application.

The bending portion of the first extension piece includes a "Z" form.

The projection piece and the first extension piece have screw fastening holes at positions opposite to each other.

The bending portion of the first extension piece has one end in contact with an upper surface of the lamp housing.

The support main has a hole for projection of the second extension piece to a lower surface of the support main.

The cover bottom is formed of aluminum.

The second extension piece and the printed circuit board have screw fastening holes at opposite positions in portions one ends of the second extension piece and the printed circuit board are in contact.

Each of the projection pieces are in the upper portion and the lower portion of a side of the top case, two first extension pieces are in portions opposite to the projection pieces, and each of the second extension pieces is at opposite ends of a long side direction of the printed circuit board.

In another embodiment, the LCD comprises a support main, a printed circuit board on one surface of the support main, a case having projection pieces projecting from a side thereof and a cover having a main portion, first extension pieces that are non-planar with the main portion and physically contacting the projection pieces, and a second extension piece non-planar with the main portion and physically contacting the printed circuit board.

In another embodiment, the LCD comprises a liquid crystal panel and a backlight portion that provides light to the liquid crystal panel. The backlight contains a reflective plate, a light plate, spreading sheets, prism sheets, a light source, and a metal shell that reflects light from the light source towards light plate. A substantially rectangular housing encloses and supports the liquid crystal panel and backlight portion. Upper and lower portions of the housing are connected together through connection tabs that extend outward from the upper and lower portions and toward each other. A support supports both the housing and connection tabs.

In another embodiment a method of manufacturing an LCD comprises enclosing a liquid crystal panel and a backlight portion that provides light to the liquid crystal panel in an enclosure containing a top case and a cover bottom, supporting the enclosure with a support main, and connecting the support main and the enclosure using projection pieces and first extension pieces that project from sides of the top case and cover bottom, respectively, and connecting the enclosure and a printed circuit board using a second extension piece extending from a side of the enclosure toward the printed circuit board.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 3:
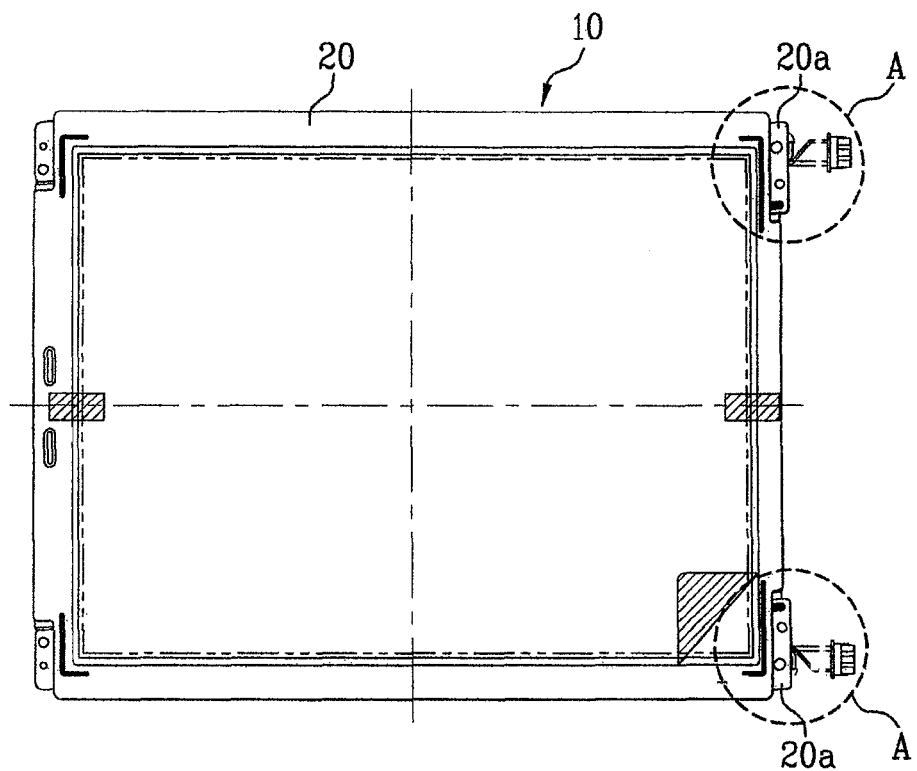
FIG. 3 illustrates a front view of an LCM in accordance with a preferred embodiment of the present invention.
Figure 4:
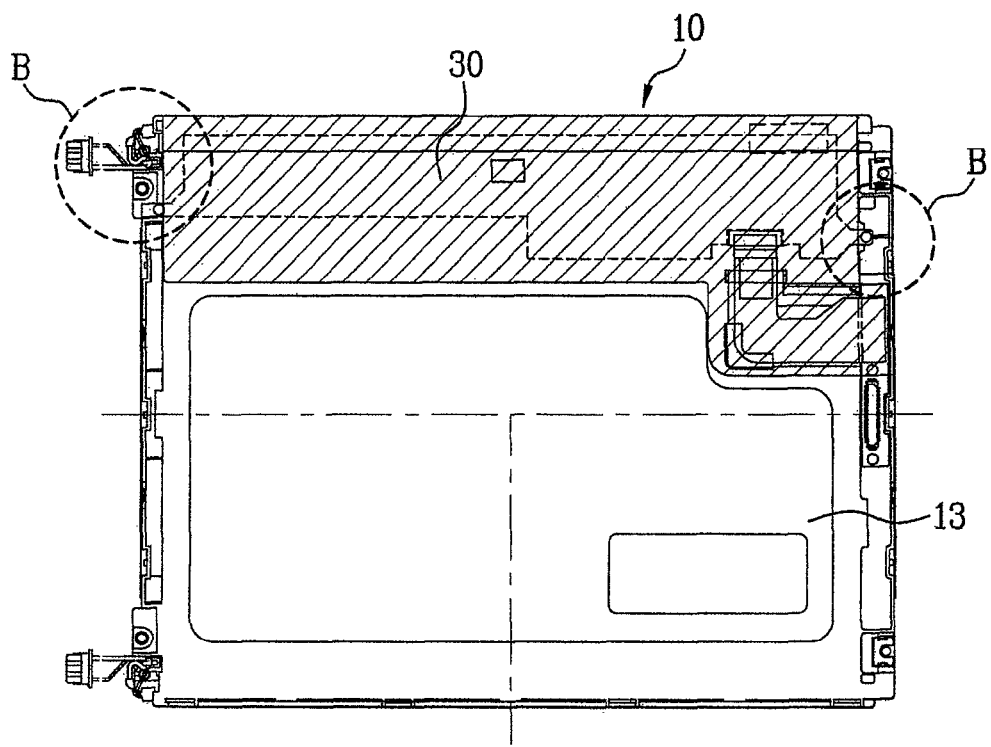
FIG. 4 illustrates a back view of an LCM in accordance with a preferred embodiment of the present invention.
Figure 5:
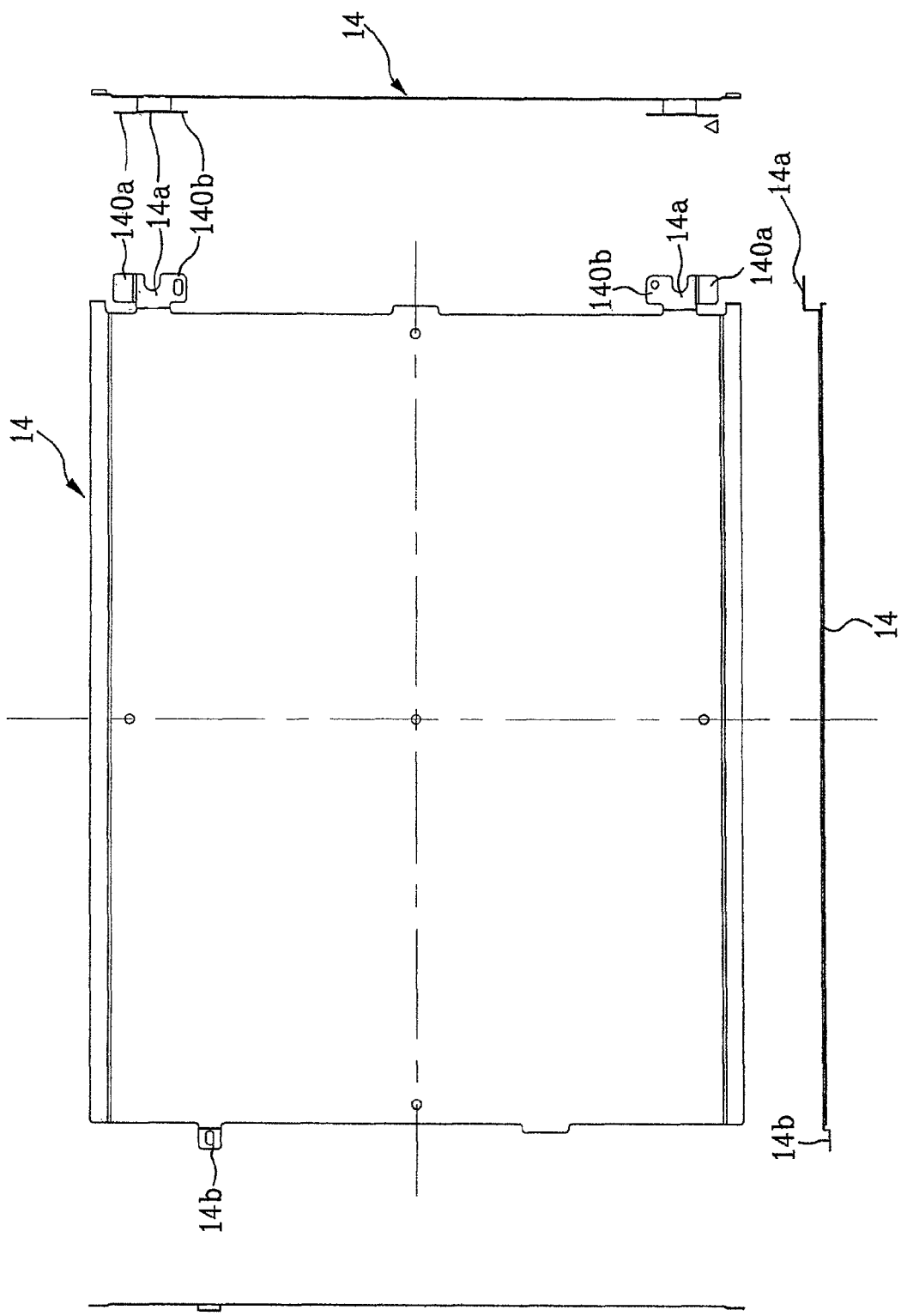
FIG. 5 illustrates plan, left and right, and low side views of a cover bottom in accordance with a preferred embodiment of the present invention.

FIGS. 3 and 4 illustrate front, and back views of an LCM 10 in accordance with a preferred embodiment of the present invention, and FIG. 5 illustrates plan, left and right, and low side views of a cover bottom in accordance with a preferred embodiment of the present invention.

FIG. 3 illustrates a front view of the LCM 10, showing front edges of the LCM 10 covered with a top case 20. The top case 20 has projection pieces 20a at 'A' parts in upper and lower portions of one side thereof. The projection piece 20a is a thin plate. The projection piece 20a has a plurality of screw holes 20a, one for screw fastening of the LCM 10 itself and rest of the screw holes 20a for fastening between the LCM 10 and a system case.

Though only connectors as shown in the drawing, the LCM 10 has two lamps at opposite long sides. However, the present invention is not limited to this, but the present invention is applicable to an LCM 10 having only one lamp provided thereto.

FIG. 4 illustrates a back side view of the LCM 10, showing a support main 13. The support main 13 has a PCB 30 in one side part of back surface thereof mounted thereon, screw fastened to the LCM 10 in screw holes in 'B' part.

Figure 1:
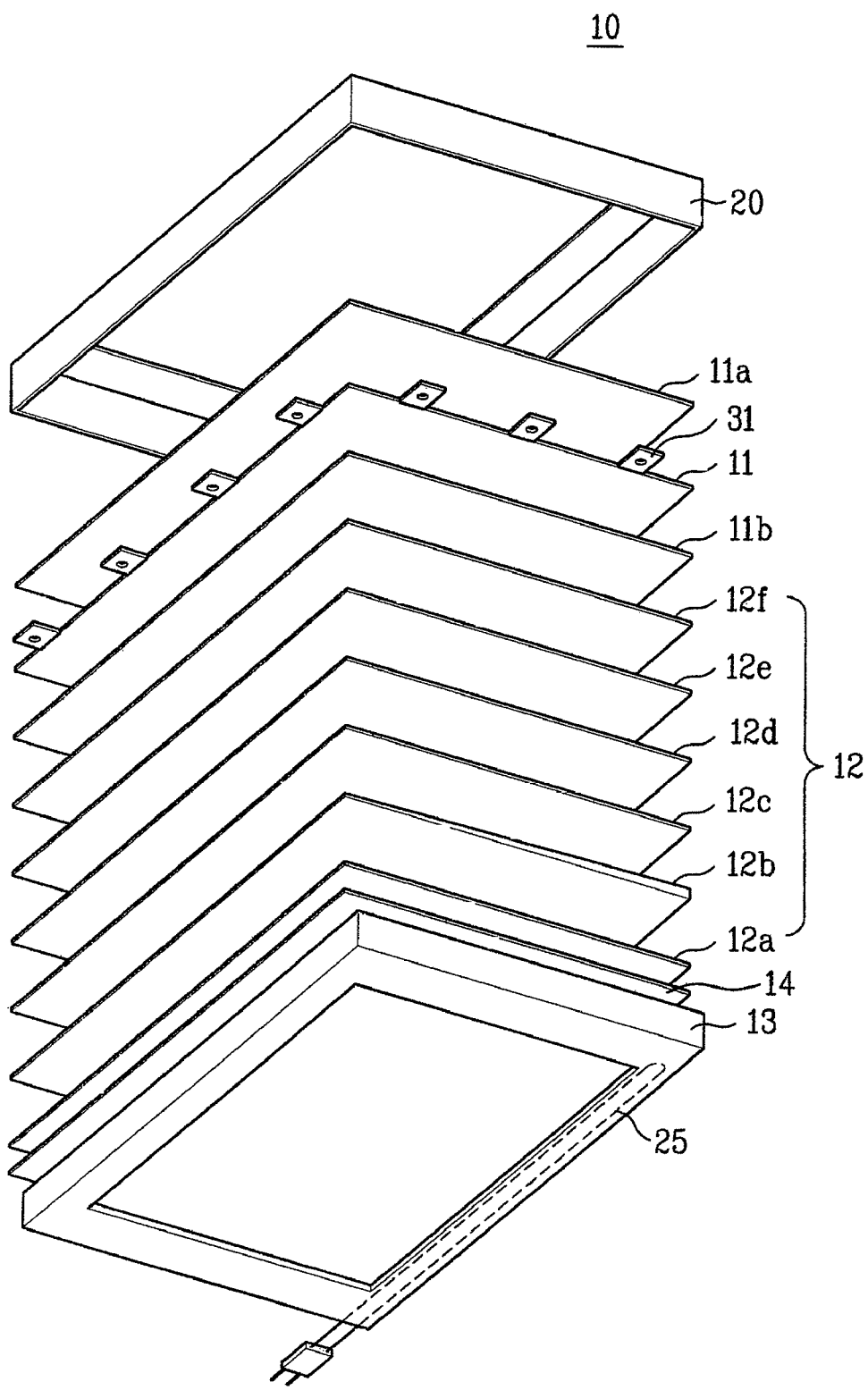
FIG. 1 illustrates a perspective disassembled view of a related art LCM.
Figure 2A:
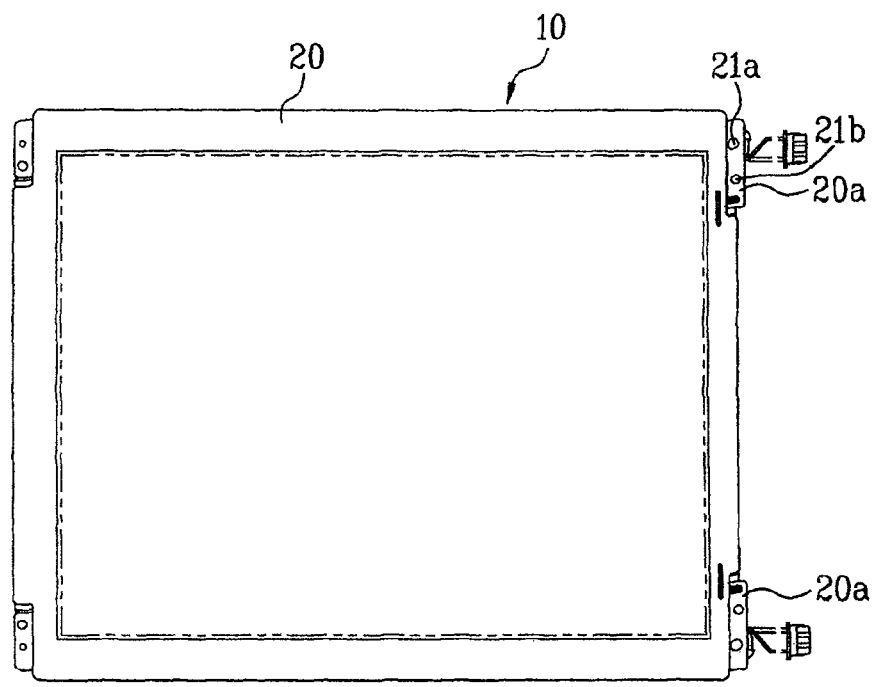
FIG. 2A illustrates a diagram of related art an LCM.
Figure 2B:
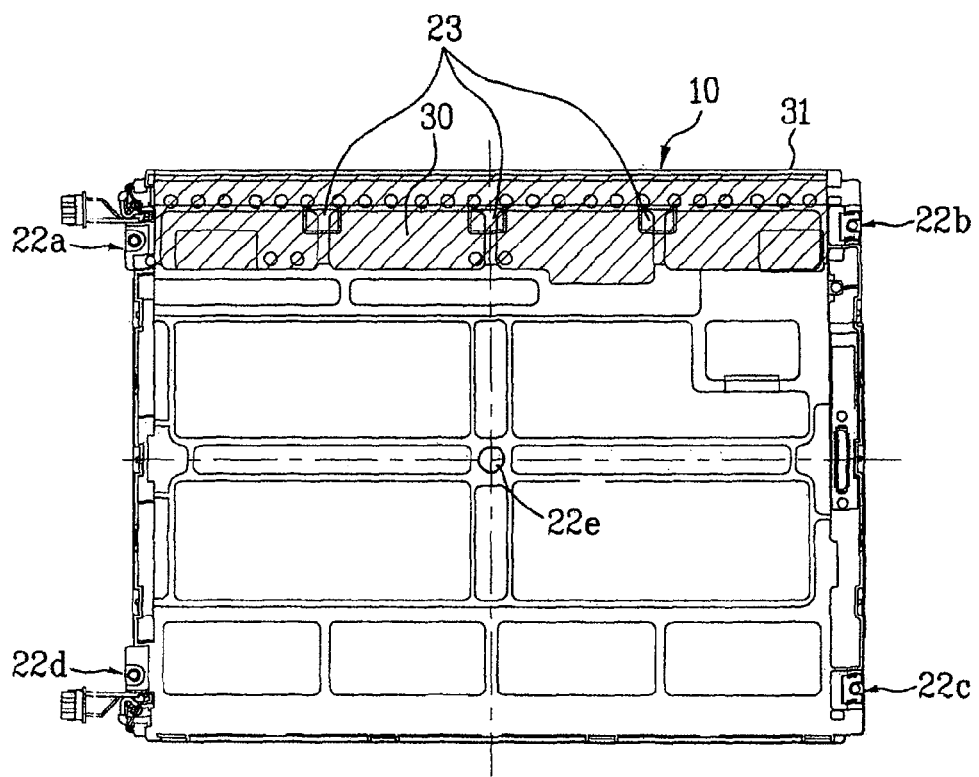
FIG. 2B illustrates a diagram of related art an LCM.

In the meantime, referring to FIG. 5, a cover bottom 14 placed on the support main for supporting a light plate (see 12B in FIG. 1) and various sheets (see 12 in FIG. 1), is formed of metal for electrical conductivity of a grounding structure of the LCM 10.

That is, referring to FIG. 5, the cover bottom 14 of the present invention has first extension pieces 14a bent upward from right side corners opposite to the projection pieces 20a, and a second extension piece 14b bent downward from a left side thereof.

The first extension piece 14a has a fastening slot in a central part for fastening the LCD 10 to a system, and a bending portion 140a and a fastening portion 140b for fastening screws 16a from a back side surface, at opposite sides of the fastening slot.

The bending portion 140a is bent upward in a "Z" form (approx. 0.3 μm) to make a secure contact with, and electrically ground to, the projection pieces 20a by an elastic force.

Moreover, though not shown, the support main 13 has a hole at opposite portion of the second extension piece 14b for projecting the second extension piece 14b to a back surface of the support main 13.

Figure 6:
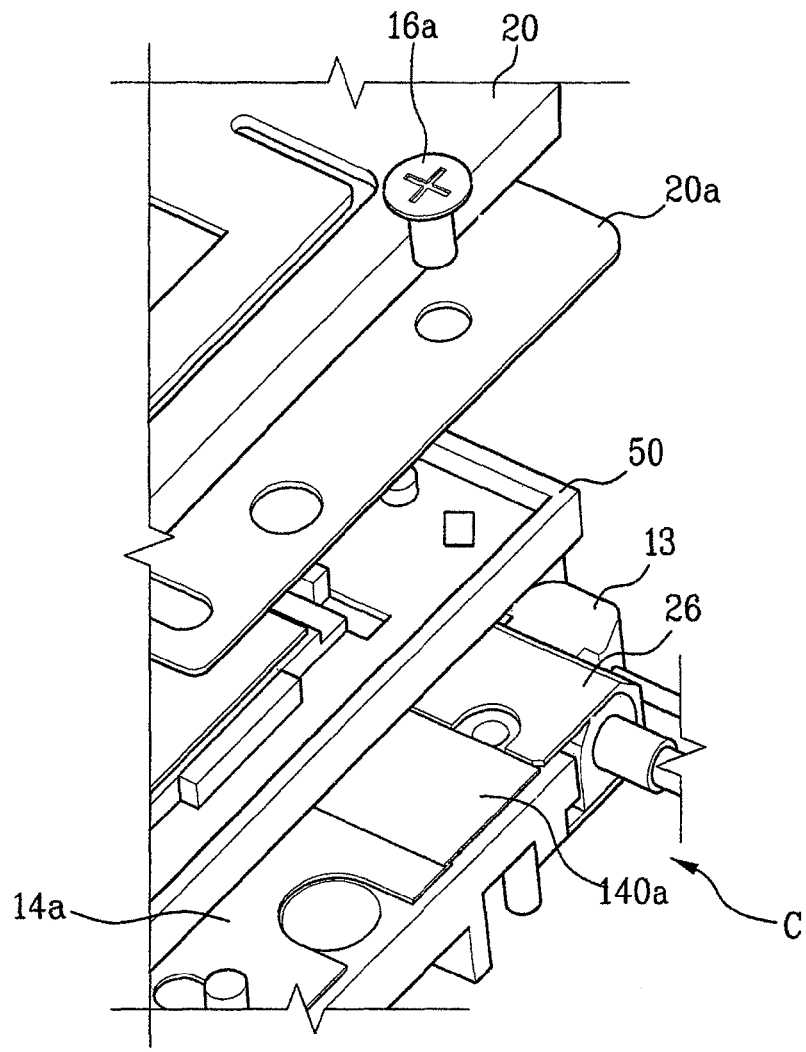
FIG. 6 illustrates a disassembled perspective view of an "A" part in FIG. 3.

FIG. 6 illustrates a disassembled perspective view of an 'A' part in FIG. 3, showing a first extension piece 14a at a position under, and opposite to the projection piece 20a extended from the cover bottom 14. The extension piece 14a is supported on the support main 13. In opposite one side parts of the projection piece 20a and the first extension piece 14a, there are screw fastening holes, and there is a female thread in opposite position of the support main 13 for receiving a screw 16a. The various layers 50 forming the LCM 10 are disposed between the top case 20 and the cover bottom 14.

According to this, the first extension piece 14a can always be grounded securely even if the LCM 10 shakes by an external force because the bending portion 14a is in contact with the projection piece 20a with an elastic force. Moreover, in the present invention, the form of the bending portion 140a is not limited to the "Z" form, but other bending forms may be possible as far as the secure contact is assured by an elastic force coming from pressure application.

Furthermore, fastening holes are formed in opposite positions of the projection piece 20a and the first extension piece 14a for the secure fastening.

Referring to FIG. 6, the projection piece 20a and the first extension piece 14a have a plurality of screw fastening holes respectively, and the support main 13 has pass through holes or female threads at positions opposite to the fastening holes. That is, the fastening holes opposite to the pass through holes are for fastening between the LCM 10 and the system case, and the fastening holes opposite to the female threads are for fastening the LCM 10 itself and the secure grounding.

It is preferable that each one the projection piece 20a and the first extension piece 14a are formed in each of upper part and lower part of a side of the LCM 10, and one fastening hole for fastening the LCM 10 and grounding and one system fastening hole are formed in each of the projection piece 20a and the first extension piece 14a.

In the meantime, the bending portion 140a of the first extension piece 14a is extended and bent so that one end thereof is in contact with an upper surface of the lamp housing 26. Since the lamp housing 26 is formed of electrically conductive material, it is required that the lamp housing 26 is grounded. For this, the present invention includes the lamp housing 26 to the electrical grounding structure between the first extension piece 14a and the projection piece 20a, to provide a more simple and effective grounding structure.

Figure 7:
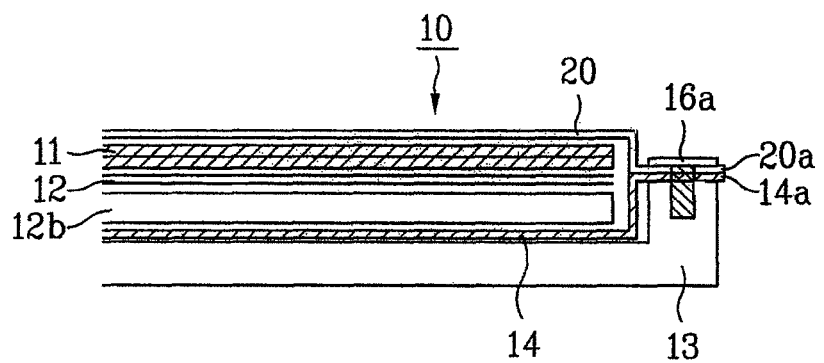
FIG. 7 illustrates a section of a screw fastening portion in FIG. 6.

FIG. 7 illustrates a section of the screw fastening portion in FIG. 6. As shown in FIG. 7, the cover bottom 14 is placed on an upper surface of the support main 13, and the light plate 12b, various sheets 12, and the liquid crystal panel 11 are placed on an upper surface of the cover bottom 14 in succession. The first extension piece 14a is extended from one side of the cover bottom 14, and bent two times in "]" forms, such that the first extension piece 14a is positioned on an upper surface of a side portion of the support main 13.

In the meantime, referring to FIG. 6, the upper surface of the side portion of the support main 13 has the same height with the upper surface of the lamp housing 26. Therefore, the first extension piece 14a is on the same plane with the upper surface of the lamp housing 26, and the bending portion 140a of the first extension piece 14a is in contact with the upper surface of the lamp housing 26. It may be possible that one end of the first extension piece 14a is on the upper surface of the lamp housing 26.

Thereafter, as the projection piece 20a of the top case 20 is placed on the upper surface of the first extension piece 14a, and screws 16a are fastened thereto, the LCM 10 is fastened securely, and rigidly, and grounded by electrical connection. That is, an electrical grounding structure connected from the lamp housing 26, the extension piece 14a, and the projection piece 20a is formed, and the top case 20 with the projection piece 20a is connected to a ground portion of the system case, to complete an entire grounding structure of the LCD.

In the meantime, the PCB 30, on the back surface of the LCM 10, has many electrical circuits, and required to be grounded, electrically.

Referring to FIG. 4, the PCB 30 is placed on the back surface of the LCM 10, and the PCB 30 has second extension pieces 14b at long side direction opposite ends 'B' respectively, for grounding the PCB 30. As shown in FIG. 5, the second extension piece 14b is bent downward, and extended from the cover bottom 14.

Figure 8A:
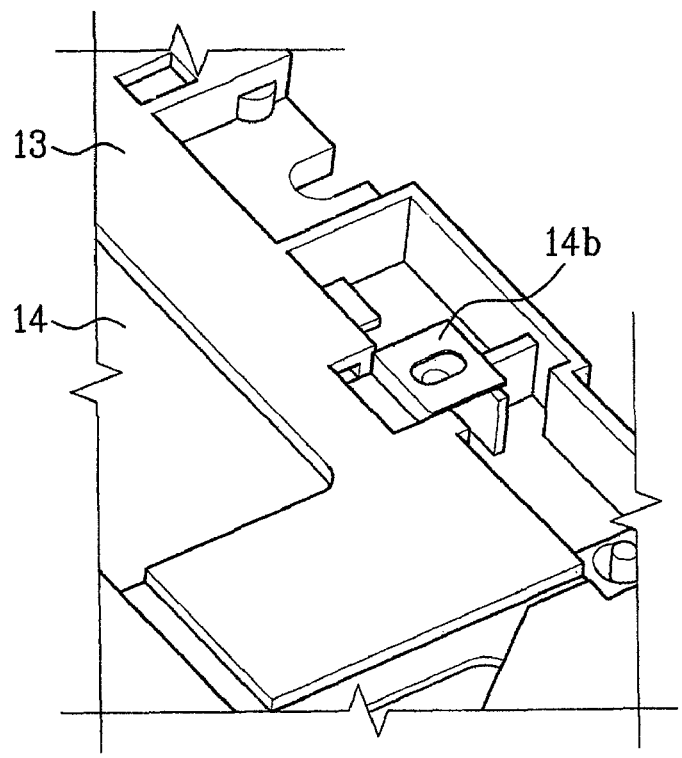
FIG. 8A illustrates a perspective view before a printed circuit board is mounted on "B" part in FIG. 4.
Figure 8B:
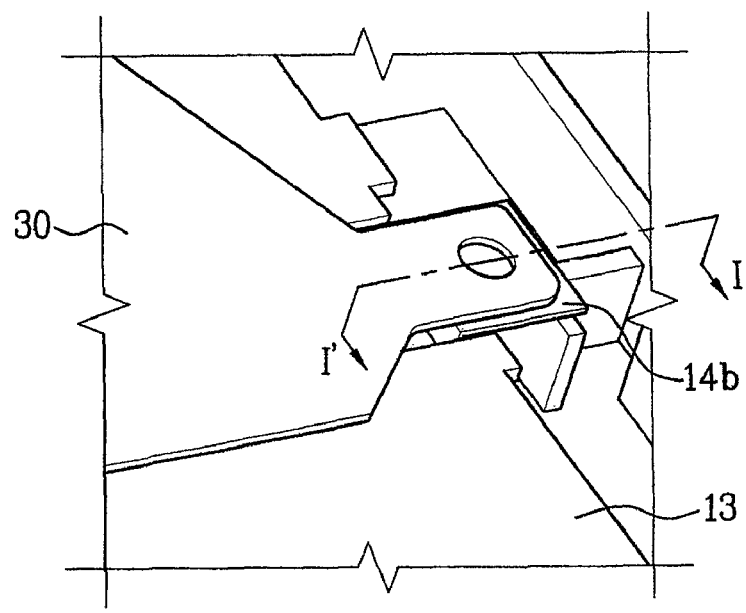
FIG. 8B illustrates a perspective view after a printed circuit board is mounted on "B" part in FIG. 4.

FIG. 8A illustrates a perspective view before a printed circuit board 30 is mounted on a "B" part in FIG. 4. As shown in FIG. 8A, the second extension piece 14b, bent downward, and extended from one end of the cover bottom 14, is projected from a lower surface to an upper surface of the support main 13 that forms a bottom part of the LCM 10. Then, as shown in FIG. 8B, by placing the PCB 30 such that a grounding portion of the PCB 30 is in contact with the projected second extension piece 14b, the PCB 30 and the cover bottom 14 are connected, electrically. That is, the second extension pieces 14b are formed at positions opposite to the grounding portions at opposite ends of the PCB 30.

Figure 9:
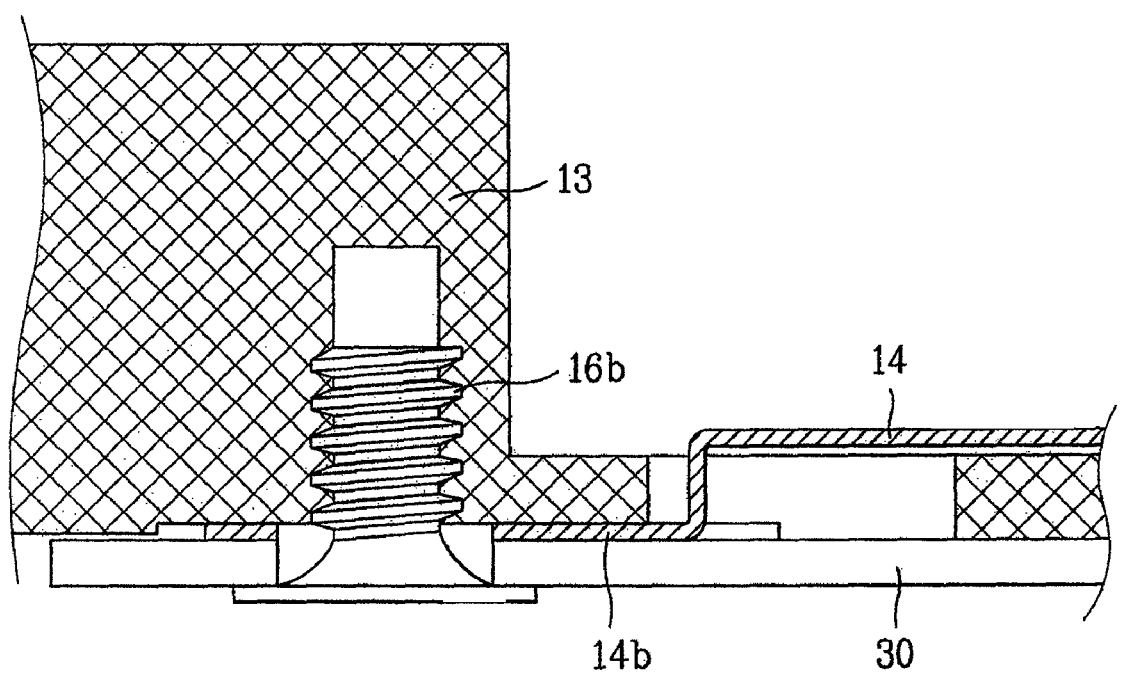
FIG. 9 illustrates a sectional view across the line I-I' in FIG. 8B.

FIG. 9 illustrates a section across line I-I' in FIG. 8B. As shown in FIG. 9, the second extension piece 14b is passed through an opened portion of the support main 13, and extended to a back surface of the support main 13. For this, as shown, the extension piece 14b is bent two times in "]" forms, and extended to a lower surface of the support main 13. However, the bending form is not limited to the "]" form, but may be sloped at a moderate angle. The PCB 30 is placed on an underside surface of the second extension piece 14b extended to the back surface of the support main 13, and as the second extension piece 14b and the grounding portion of the PCB 30 are fastened to a back surface of the support main 13 by screw fastening, a secure grounding structure is formed.

Accordingly, grounding of the PCB 30 is made by a successive electrical connection of the grounding structure of the second extension piece 14b, the cover bottom 14, the first extension piece 14a, the projection piece 20a, the top case 20, and the system outside case.

The cover bottom 14 with the first extension piece 14a and the second extension piece 14b is formed of aluminum. The aluminum is a material having good electrical conductivity and a good heat transfer characteristic when used as a heat discharge plate. Moreover, the aluminum is light and is suitable for a material of the cover bottom 14 that serves as a ground and a heat discharge plate.

Although aluminum may be used as the material of the cover bottom 14, the material of the cover bottom 14 is not limited to aluminum, but other materials are also acceptable if the material has good electrical conductivity and a good heat transfer characteristic.

Referring to FIGS. 3 and 4, the projection pieces 20a and the first extension pieces 14a are formed in the upper portion and the lower portion of a side of the top case 20 respectively, and the second extension pieces 20a are formed at opposite ends of a long side direction of the PCB 30, respectively. The projection pieces 20a, the first extension pieces 14a, and the second extension pieces 14b have screw fastening holes formed therein. Therefore, the total number of screws 16a for fastening the LCM 10 itself and the grounding structure is four, as two screws 16a are required for fastening the projection pieces 20a and the first extension pieces 14a, and fastening the second extension pieces 14b. Accordingly, the total number of screws 16a is reduced compared to the related art.

As described before, for making rigid grounding when the LCD is subject to external shaking or impact, the first and second extensions 14a and 14b are formed in the cover bottom 14. The first extension piece 14a is grounded with the lamp housing 26 and the projection pieces 20a of the top case 20, and the second extension piece 14b grounds the PCB 30, to form a stable and productive ground structure.

As has been described, the LCD of the present invention has the following advantages.

First, the reduction of the number of screw fastenings for fastening and grounding the LCM itself permits a reduction in cost and improves productivity.

Second, the decrease in fastenings reduces the introduction of foreign material formed during fabrication into the LCM, to secure stable performance of the LCM.

Third, the elastic bending of the extension portions prevents unstable grounding caused by assembly tolerances and the like in screw fastening between the projection portions and the extension portions, thereby providing a secure ground structure.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device (LCD) comprising:
   a support main which is a bottom portion of a liquid crystal display device module;
   a lamp housing at a side of the support main in a long side direction of the support main;
   a printed circuit board on a back surface of the support main;
   a top case which is a top portion of the liquid crystal display device module, having projection pieces from a side thereof; and
   a cover bottom on an upper surface of the support main, having first extension pieces making electrical connection to the top case, and a second extension piece projecting in a thickness direction toward the printed circuit board and making electrical connection to the printed circuit board;
   wherein the support main has a hole for projection of the second extension piece to a lower surface of the support main.

2. The LCD as claimed in claim 1, wherein the first extension pieces oppose the projection pieces, and each first extension piece includes a bending portion in a portion in contact with the opposing projection piece that permits elastic deformation upon application of pressure.

3. The LCD as claimed in claim 2, wherein the bending portion of each first extension piece is shaped in a "Z".

4. The LCD as claimed in claim 2, wherein the projection pieces and the first extension pieces have fastening holes at positions opposite to each other.

5. The LCD as claimed in claim 2, wherein the bending portion of each first extension piece has one end in contact with an upper surface of the lamp housing.

6. The LCD as claimed in claim 1, wherein the second extension piece and the printed circuit board have fastening holes opposing each other in ends that are in contact.

7. The LCD as claimed in claim 1, wherein each of the projection pieces are in upper and lower portions of a side of the top case, two first extension pieces oppose the projection pieces, and the second extension piece is disposed at an opposite end of the long side direction of the printed circuit board from the projection pieces and first extension pieces.

8. A liquid crystal display device (LCD) comprising:
   a support main;
   a printed circuit board on one surface of the support main;
   a case having projection pieces projecting from a side thereof; and
   a cover having a main portion, first extension pieces that are non-planar with the main portion and physically contacting the projection pieces, and a second extension piece non-planar with the main portion and physically contacting the printed circuit board;
   wherein the first extension pieces extend upwardly and outwardly relative to the main portion of the cover bottom, and the second extension piece extends downwardly and outwardly relative to the main portion of the cover bottom.

9. The LCD as claimed in claim 8, wherein the first extension pieces include bending portions that permit elastic deformation of the first extension pieces upon application of pressure.

10. The LCD as claimed in claim 9, wherein the first extension pieces have ends that are substantially parallel and non-planar with the main portion of the cover and the bending portions are substantially perpendicular to the ends of the first extension pieces and main portion of the cover.

11. The LCD as claimed in claim 10, further comprising a plurality of lamps and lamp housings surrounding the lamps that reflect light from the lamps towards the LCD, the lamps and lamp housings provided at opposing sides of the support main, and the end of each first extension piece is in physical contact with one of the lamp housings.

12. The LCD as claimed in claim 9, wherein the projection pieces and the first extension pieces have aligned fastening holes.

13. The LCD as claimed in claim 10, further comprising a lamp disposed at one side of the support main and a lamp housing surrounding the lamp that reflects light from the lamp towards the LCD, and the end of one of the first extension pieces is in physical contact with the lamp housing.

14. The LCD as claimed in claim 8, wherein the support main has a hole in which the second extension piece is disposed.

15. The LCD as claimed in claim 8, wherein the second extension piece and the printed circuit board have aligned fastening holes in ends that are in contact.

16. The LCD as claimed in claim 8, wherein the first extension pieces and projection pieces are each symmetrically disposed along one side of the cover and case around a center line of the cover and the case, respectively, and the second extension piece is disposed on an opposite side of the printed circuit board from the first extension pieces and projection pieces.

17. The LCD as claimed in claim 16, wherein only two first extension pieces and one second extension piece extend from the cover bottom.

18. The LCD as claimed in claim 8, wherein the main portion of the cover is substantially rectangular, and the projection pieces and the first and second extension pieces are substantially smaller than the sides from which the projection pieces and the first and second extension pieces extend.

19. The LCD as claimed in claim 8, wherein a portion of the second extension piece contacting the printed circuit board is substantially planar with a surface of the support main contacting the printed circuit board.

* * * * *